US012742475B2

(12) United States Patent
Hu et al.

(10) Patent No.: US 12,742,475 B2
(45) Date of Patent: Sep. 22, 2026

(54) MAGNETIC BEARING AND COMPRESSOR

(71) Applicant: GREE ELECTRIC APPLIANCES, INC. OF ZHUHAI, Zhuhai (CN)

(72) Inventors: Yusheng Hu, Zhuhai (CN); Weilin Guo, Zhuhai (CN); Gao Gong, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 200 days.

(21) Appl. No.: 18/841,521

(22) PCT Filed: Dec. 21, 2022

(86) PCT No.: PCT/CN2022/140606
§ 371 (c)(1),
(2) Date: Aug. 26, 2024

(87) PCT Pub. No.: WO2023/226401
PCT Pub. Date: Nov. 30, 2023

(65) Prior Publication Data

US 2025/0163962 A1 May 22, 2025

(30) Foreign Application Priority Data

May 26, 2022 (CN) ......................... 202210582085.3

(51) Int. Cl.
*F16C 32/04* (2006.01)
*F04D 29/058* (2006.01)

(52) U.S. Cl.
CPC ........ *F16C 32/0468* (2013.01); *F16C 32/047* (2013.01); *F16C 32/0474* (2013.01);
(Continued)

(58) Field of Classification Search
CPC .. F16C 32/0465; F16C 32/047; F16C 32/048; F16C 32/0482; F16C 32/0485; F16C 32/0489; F16C 32/0491
(Continued)

(56) References Cited

U.S. PATENT DOCUMENTS 5,216,308 A * 6/1993 Meeks ................ F16C 32/0446 310/90.5
5,514,924 A * 5/1996 McMullen .......... F16C 32/0485 310/90.5
(Continued)

FOREIGN PATENT DOCUMENTS

CN 101235848 A * 8/2008 .......... F16C 32/0485
CN 104565036 A * 4/2015 .............. F16C 32/04
(Continued)

OTHER PUBLICATIONS

Office Action mailed May 30, 2025, in corresponding Chinese application No. 202210582085.3, filed May 26, 2025, 15 pages.
(Continued)

*Primary Examiner* — Oluseye Iwarere
*Assistant Examiner* — Daniel K Schlak
(74) *Attorney, Agent, or Firm* — CHRISTENSEN O'CONNOR JOHNSON KINDNESS PLLC

(57) ABSTRACT

Disclosed are a magnetic bearing and a compressor. The magnetic bearing comprises a first axial iron core and a radial iron core, wherein the first axial iron core has a first accommodating space, in which an annular positioning boss is arranged; the annular positioning boss has an axial positioning surface and a radial positioning surface; and a magnetic conductive ring is arranged in the first accommodating space, the magnetic conductive ring can be connected to both the axial positioning surface and the radial positioning surface in a fitting manner to achieve positioning of the
(Continued)

magnetic conductive ring in both an axial direction and a radial direction of the first axial iron core, and the magnetic conductive ring is sleeved on an outer circumferential wall of the radial iron core.

20 Claims, 9 Drawing Sheets

(52) U.S. Cl.
CPC ...... *F16C 32/0485* (2013.01); *F16C 32/0489* (2013.01); *F16C 32/0491* (2013.01); *F04D 29/058* (2013.01); *F16C 32/0465* (2013.01); *F16C 32/0482* (2013.01); *F16C 2360/00* (2013.01)

(58) Field of Classification Search
USPC .......................................................... 310/90.5
See application file for complete search history.

(56) References Cited

U.S. PATENT DOCUMENTS

| | | | | |
|---|---|---|---|---|
| 6,897,587 | B1 * | 5/2005 | McMullen | H02K 7/09<br>310/90.5 |
| 2003/0155829 | A1 * | 8/2003 | McMullen | F16C 32/0465<br>310/90.5 |
| 2009/0201111 | A1 * | 8/2009 | Filatov | F16C 32/0489<br>335/209 |
| 2011/0163622 | A1 * | 7/2011 | Filatov | H02K 7/09<br>310/90.5 |
| 2011/0234033 | A1 * | 9/2011 | Filatov | F16C 32/0465<br>310/90.5 |
| 2012/0212093 | A1 * | 8/2012 | Sande | H02K 1/14<br>156/60 |
| 2018/0238387 | A1 * | 8/2018 | Tangudu | F16C 32/0465 |
| 2019/0257355 | A1 * | 8/2019 | Tangudu | F16C 32/0474 |
| 2020/0235635 | A1 * | 7/2020 | Zhang | F16C 32/0465 |
| 2022/0336133 | A1 * | 10/2022 | Uzhegov | H02K 7/09 |
| 2023/0287893 | A1 * | 9/2023 | Oniduka | F04D 13/064 |

FOREIGN PATENT DOCUMENTS

| | | | | | |
|---|---|---|---|---|---|
| CN | 105299046 | A | | 2/2016 | |
| CN | 205136373 | U | | 4/2016 | |
| CN | 106015332 | A | * | 10/2016 | F16C 32/0406 |
| CN | 106369052 | A | | 2/2017 | |
| CN | 107546904 | A | * | 1/2018 | H02K 5/16 |
| CN | 108591259 | A | * | 9/2018 | F16C 32/0425 |
| CN | 108644230 | A | * | 10/2018 | F16C 32/0474 |
| CN | 109058296 | A | * | 12/2018 | F16C 32/044 |
| CN | 208252600 | U | * | 12/2018 | F16C 32/04 |
| CN | 109707735 | A | * | 5/2019 | F16C 32/04 |
| CN | 110017328 | A | * | 7/2019 | F16C 32/0408 |
| CN | 110864043 | A | | 3/2020 | |
| CN | 210978221 | U | * | 7/2020 | F16C 32/04 |
| CN | 112303121 | A | * | 2/2021 | F04D 13/064 |
| CN | 112483547 | A | | 3/2021 | |
| CN | 112727924 | A | | 4/2021 | |
| CN | 112879431 | A | | 6/2021 | |
| CN | 112983988 | A | | 6/2021 | |
| CN | 213575188 | U | * | 6/2021 | F16C 32/04 |
| CN | 113586609 | A | | 11/2021 | |
| CN | 114992239 | A | | 9/2022 | |
| CN | 217481772 | U | | 9/2022 | |
| JP | 2002161918 | A | | 6/2002 | |
| JP | 2014051995 | A | | 3/2014 | |

OTHER PUBLICATIONS

Extended European Search Report mailed No. May 7, 2025, issued in corresponding European Application EP 22943588, filed Dec. 21, 2022, 10 pages.
International Search Report and Written Opinion mailed Mar. 12, 2023, issued in corresponding International Application No. PCT/CN2022/140606, filed Dec. 21, 2022, 15 pages.

* cited by examiner

MAGNETIC BEARING AND COMPRESSOR

CROSS-REFERENCE TO RELATED APPLICATIONS

This application is the national phase under 35 U.S.C. § 371 of PCT International Application No. PCT/CN2022/140606, which has an international filing date of Dec. 21, 2022 and claims priority of Chinese patent application No. 202210582085.3. The contents of the above identified PCT international application and Chinese patent application are hereby incorporated in their entireties by reference for all purposes.

TECHNICAL FIELD

The present disclosure relates to the field of bearing manufacturing technologies, and in particular, to a magnetic bearing and a compressor.

BACKGROUND

Magnetic bearings have a series of advantages such as no contact, no wear, high speed, high precision, no need for lubrication and sealing, etc. They are high-tech products integrating electromagnetism, electronic technology, control engineering, signal processing and mechanics.

Magnetic bearings are divided into three types: active, passive, and hybrid. An active magnetic bearing has high stiffness and can be precisely controlled, but volume and power consumption required to produce unit load-bearing capacity are large. By using attraction or repulsion between magnetic materials to achieve rotor levitation, a passive magnetic bearing has relatively low stiffness and damping. By using a permanent magnet to provide a bias magnetic field to replace a static bias magnetic field generated by an electromagnet in an active magnetic bearing, a hybrid magnetic bearing reduces ampere-turns of control winding, reduces the volume of bearing, and improves bearing capacity. The hybrid magnetic bearing has irreplaceable advantages in areas with strict requirements on volume and power consumption, and magnetic bearings are mainly used in high-speed and ultra-high-speed applications. Therefore, integration and miniaturization of magnetic levitation systems and improving stability and reliability of control systems will be key research directions.

A structure of a magnetic bearing in the related art (taking a three-degree-of-freedom magnetic bearing as an example) is shown in FIG. 1. A permanent magnet 10 is directly sleeved on an outside of a radial stator core 5. In order to reduce magnetic leakage, a fitting clearance between the outside of the radial stator core 5 and the permanent magnet 10 should be as small as possible. The radial stator core 5 is formed by stacking laminations. It is difficult to ensure the fitting clearance between the permanent magnet 10 and the radial stator core 5 in actual parts processing. Similarly, an assembly consisting of the radial stator core 5, the permanent magnet 10, and a magnetic conductive ring 9 is an integral part. The permanent magnet 10 is located between the radial stator core 5 and the magnetic conductive ring 9. An axial end surface of the magnetic conductive ring 9 is further connected to an upper core and a lower core (an axial stator core 1). The permanent magnet 10 cannot be machined, so it is difficult to ensure precise positioning of relevant components in the magnetic bearing.

SUMMARY

A magnetic bearing and a compressor are provided in the present disclosure, which can overcome the shortcomings of the magnetic bearing in the related art that a permanent magnet is clamped between a magnetic conductive ring and a radial stator core, so that a positioning accuracy of the radial stator core is limited by an accuracy of the permanent magnet, and the permanent magnet cannot be machined, resulting in low positioning accuracy of the radial stator core.

In order to solve the above problems, a magnetic bearing is provided in the present disclosure. The magnetic bearing includes a first axial iron core and a radial iron core. The first axial iron core includes a first accommodating space in which an annular positioning boss is arranged. The annular positioning boss includes an axial positioning surface and a radial positioning surface. A magnetic conductive ring is arranged in the first accommodating space. The magnetic conductive ring can be cooperatively connected to both the axial positioning surface and the radial positioning surface to position the magnetic conductive ring in both an axial direction and a radial direction of the first axial iron core. The magnetic conductive ring is sleeved on an outer circumferential wall of the radial iron core.

In some embodiments, an end opening of a central through hole of the magnetic conductive ring includes a limiting ring boss extending radially inward, and the limiting ring boss is capable of limiting an axial direction of the radial iron core.

In some embodiments, the magnetic bearing further includes a plurality of magnetic steels, an annular clearance is formed between an outer circumferential wall of the magnetic conductive ring and a wall of the first accommodating space, the plurality of the magnetic steels is arranged in the annular clearance at intervals along a circumference of a circumference of the annular clearance, and a fitting clearance is formed between the magnetic steels and the annular clearance.

In some embodiments, the magnetic bearing further includes two axial winding assemblies, and the two axial winding assemblies are respectively connected to two axial end surfaces of the radial iron core in a one-to-one correspondence.

In some embodiments, the axial winding assembly includes a winding skeleton and an axial control winding, the axial control winding is wound in an annular groove of the winding skeleton, a side of the winding skeleton facing the radial iron core includes a plug-in structure, and winding skeletons respectively connected to the two axial end surfaces of the radial iron core are connected as a whole through the plug-in structure.

In some embodiments, the plug-in structure includes a male base and a female base, and the male base and the female base are both arranged on a same winding skeleton.

In some embodiments, a radial control winding is wound on the radial iron core, and a cable through hole is arranged on the first axial iron core. The lead wires of two axial control windings and the radial control winding are led out from the first accommodating space to outside of the first accommodating space via the cable through hole.

In some embodiments, the magnetic bearing further includes a second axial iron core, which is detachably connected to the first axial iron core so as to be able to close the first accommodating space; and/or the annular positioning boss is a non-magnetic positioning ring detachably connected to the first accommodating space.

In some embodiments, the magnetic bearing further includes a rotating shaft assembly, which includes a thrust plate. The first axial iron core and/or the second axial iron core includes a thrust plate through-hole embedded with a protective bearing, and the protective bearing is sleeved with a clearance on an outer circumferential side of the thrust plate.

In some embodiments, an axial clearance adjustment ring is sleeved on the outer circumferential side of the thrust plate, the protective bearing clearance is sleeved with a clearance on an outer circumferential side of the axial clearance adjustment ring, the outer circumferential side of the thrust plate is further sleeved with a rotor core assembly and a locking member spaced therefrom, the axial clearance adjustment ring is clamped by the locking member and the rotor core assembly, an axial limiting clearance groove is formed on an outer circumferential wall of the axial clearance adjustment ring, an inner ring of the protective bearing is sleeved in the axial limiting clearance groove, and an axial length of the protective bearing is less than an axial length of the axial limiting clearance groove to form an axial protection clearance therebetween.

In some embodiments, the magnetic bearing further includes a rotating shaft assembly. The rotating shaft assembly includes a non-magnetic conductive collar and a rotor core sleeved on an outer circumferential side of the non-magnetic conductive collar, both axial ends of the rotor core are provided with a core shaft end baffle to axially position the rotor core, the core shaft end baffle is magnetically conductive, and an axial adjustment clearance is formed between the core shaft end baffle and the first axial iron core or the second axial iron core adjacent thereto, or, the rotating shaft assembly includes a magnetic conductive collar and a rotor core sleeved on an outer circumferential side of the magnetic conductive collar, both axial ends of the rotor core are provided with a core shaft end baffle to axially position the rotor core, the core shaft end baffle is magnetically conductive, and an axial adjustment clearance is formed between the core shaft end baffle and the first axial iron core or the second axial iron core adjacent thereto.

In some embodiments, the rotating shaft assembly includes a magnetic conductive collar, and a magnetic isolation plate is further arranged between the core shaft end baffle and a corresponding end of the rotor core.

In some embodiments, the magnetic bearing further includes a rotating shaft assembly, which includes a rotor core, and the rotor core is sleeved on an outer circumferential side of the thrust plate. Both axial ends of the rotor core are provided with a core shaft end baffle to axially position the rotor core, and the core shaft end baffle is magnetically conductive.

In some embodiments, at least one of two core shaft end baffles includes an extension collar extending axially toward a side of the rotor core, and the extension collar is sleeved between a central through hole of the rotor core and an outer circumferential wall of the thrust plate.

In some embodiments, the rotating shaft assembly further includes a non-magnetic conductive collar or a magnetic conductive collar, and positioning between the rotor core and the non-magnetic conductive collar, or between the magnetic conductive collar and the thrust plate, is achieved by positioning screws.

A compressor is further provided in the present disclosures, including the above-mentioned magnetic bearing.

A magnetic bearing and a compressor are provided in the present disclosure, in which an installation reference of the radial iron core is jointly determined by the first axial iron core located at an outermost radial side—the annular positioning boss—the magnetic conductive ring—a wall of the central through hole of the magnetic conductive ring. This positioning dimension chain does not involve magnetic steel (such as permanent magnet) in related technologies. Positioning and matching surfaces of each component in this dimension chain can be machined to ensure its shape and position accuracy, so that positioning of the radial iron core is more accurate, thereby effectively avoiding a problem of large positioning accuracy error of the radial iron core due to the positioning of the radial iron core in the related technologies being related to the magnetic steel.

Figure 1:
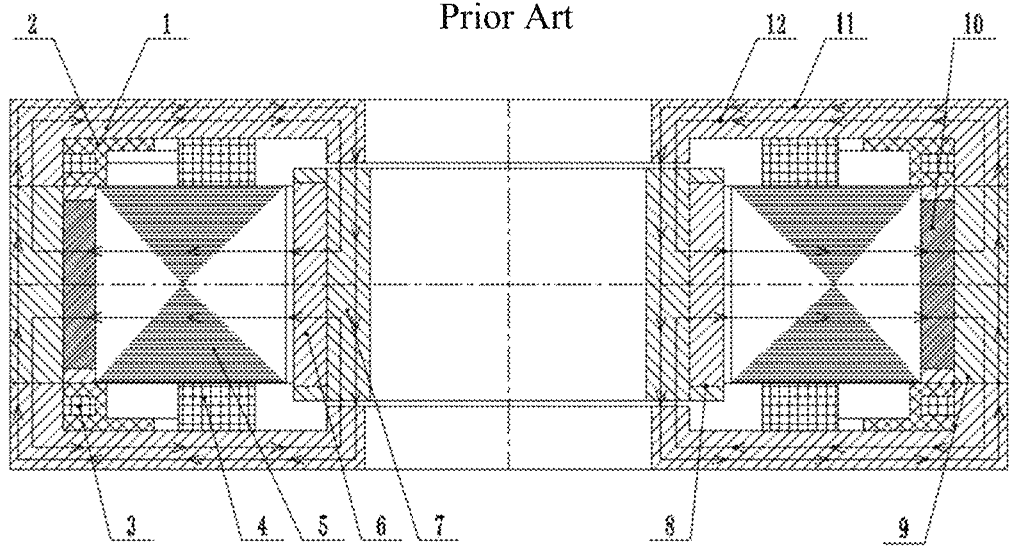
FIG. 1 is a schematic diagram (cross-sectional view) illustrating an internal structure of a three-degree-of-freedom magnetic bearing in the related art, in which arrows illustrate an axial control magnetic circuit.
Figure 2:
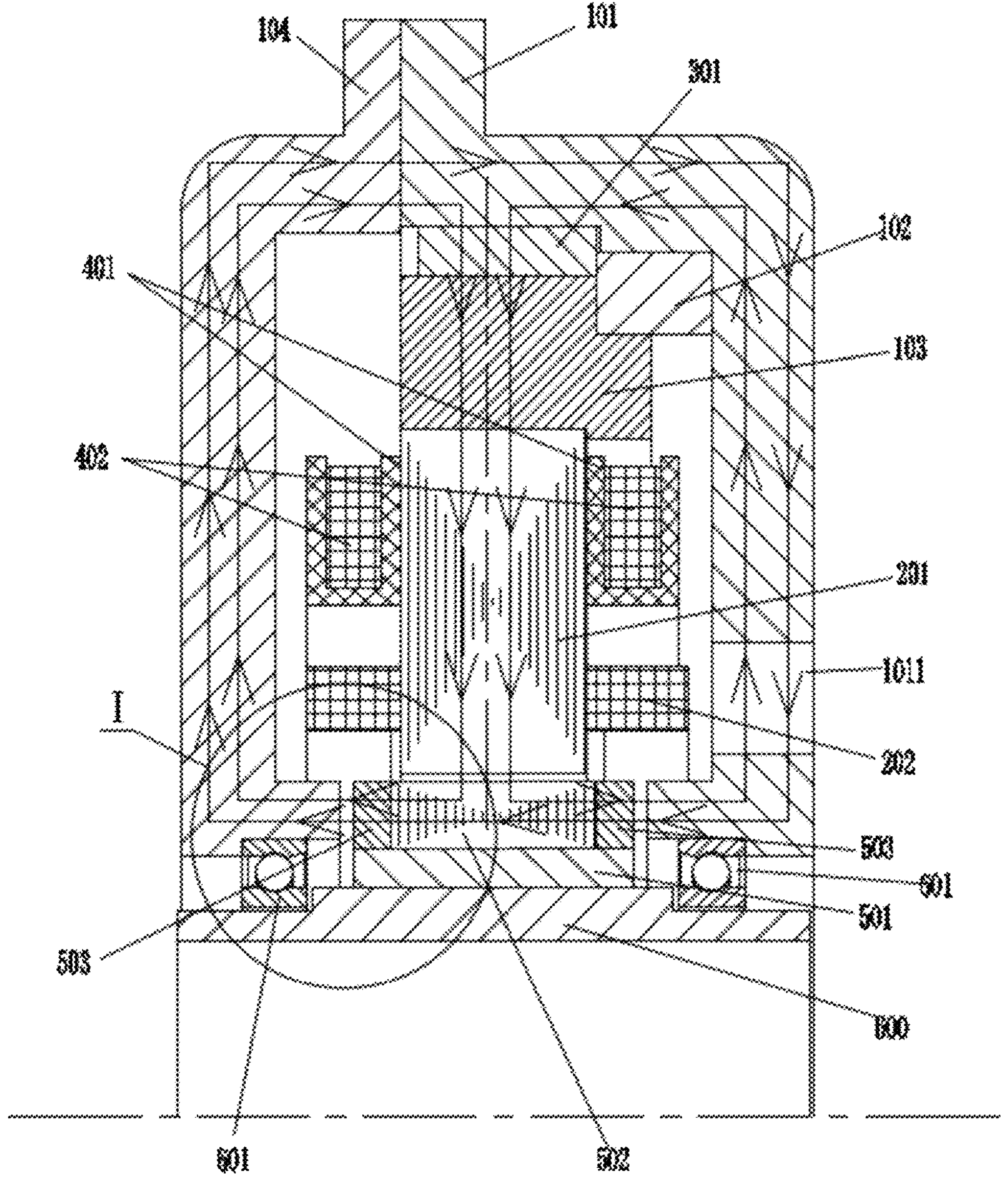
FIG. 2 is a schematic diagram (partial cross-sectional view) illustrating an internal structure of a magnetic bearing in an embodiment of the present disclosure, in which arrows illustrate an axial control magnetic circuit.
Figure 3:
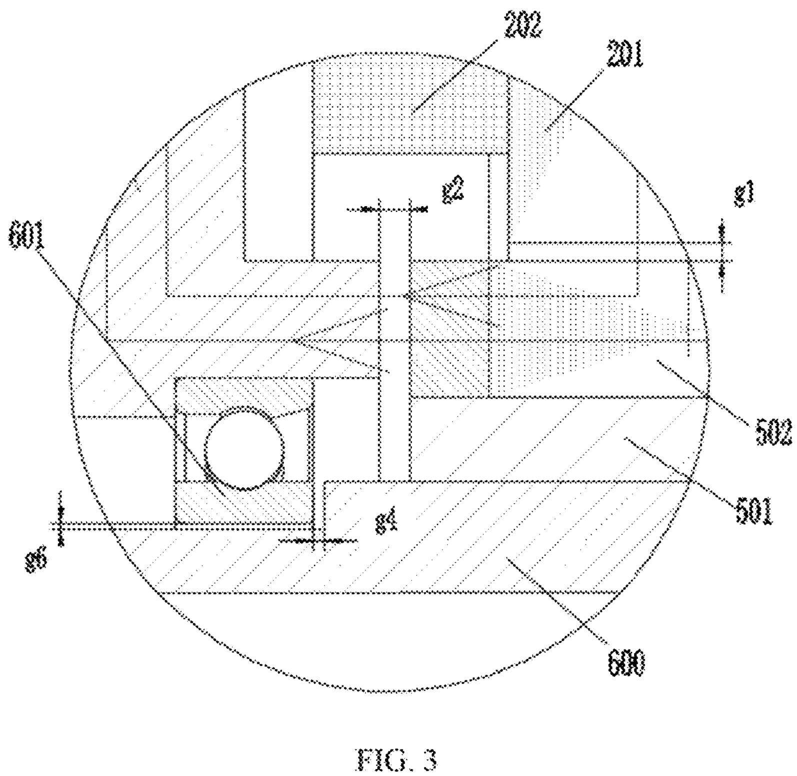
FIG. 3 is a partial enlarged view illustrating point I in FIG. 2.
Figures 4, 5:
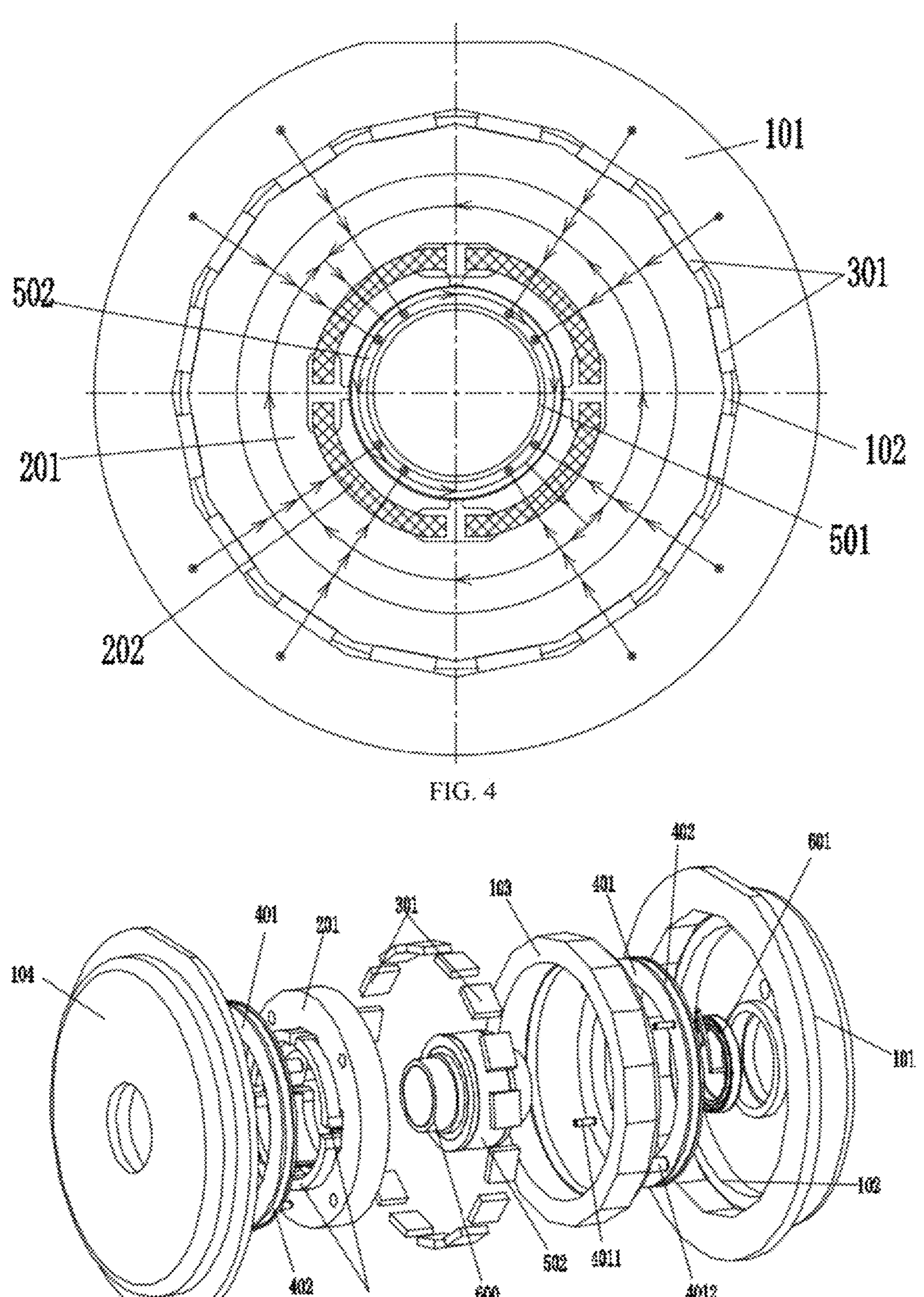
FIG. 4 is a schematic diagram illustrating a magnetic bearing in FIG. 2 from an axial perspective (from a side of a second axial iron core toward a side of a first axial iron core), and arrows in the FIG. 4 illustrate a radial control magnetic circuit. 5
FIG. 5 is a schematic diagram illustrating a structural decomposition of a magnetic bearing in FIG. 2.
Figure 6:
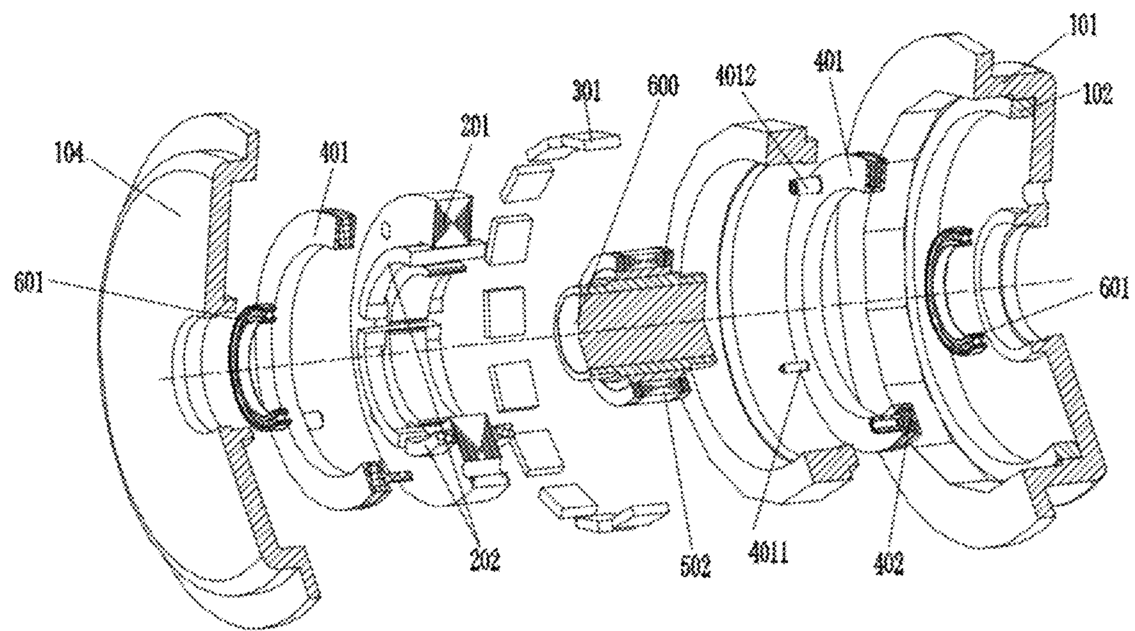
FIG. 6 is a partial cross-sectional view illustrating a magnetic bearing in FIG. 5.

The reference numerals include:

1—Axial iron core; 2—Axial winding skeleton; 3—Axial winding; 4—Radial winding; 5—Radial iron core; 6—Rotor core; 7—Rotor collar; 8—Core limit baffle; 9—Magnetic conductive ring; 10—Permanent magnet; 11—Axial control magnetic circuit; 12—Permanent magnet bias magnetic circuit; 101—First axial iron core; 1011—Cable through hole; 102—Annular positioning boss; 103—Magnetic conductive ring; 104—Second axial iron core; 201—Radial iron core; 202—Radial control winding; 301—Magnetic steel; 401—Winding skeleton; 4011—Male base; 4012—Female base; 402—Axial control winding; 501—Non-magnetic conductive collar; 502—Rotor core; 503—Core shaft end baffle; 504—Magnetic isolation plate; 505—Magnetic conductive collar; 600—thrust plate; 601—protective bearing; 602—axial clearance adjustment ring; 603—locking member; and 604—bearing cover.

DETAILED DESCRIPTION OF THE EMBODIMENTS

Referring to FIG. 2 to FIG. 14, a magnetic bearing is provided in an embodiment of the present disclosure. The magnetic bearing includes a first axial iron core 101 and a radial iron core 201. The first axial iron core 101 includes a first accommodating space in which an annular positioning boss 102 is arranged. The annular positioning boss 102 includes an axial positioning surface and a radial positioning surface. A magnetic conductive ring 103 is arranged in the first accommodating space. The magnetic conductive ring 103 is capable of being cooperatively connected to both the axial positioning surface and the radial positioning surface to position the magnetic conductive ring 103 in both an axial direction and a radial direction of the first axial iron core 101. The magnetic conductive ring 103 is sleeved on an outer circumferential wall of the radial iron core 201. An installation reference of the radial iron core 201 in this technical solution is jointly determined by the first axial iron core 101 located at an outermost radial side—the annular positioning boss 102—the magnetic conductive ring 103—a wall of a central through hole of the magnetic conductive ring 103. This positioning dimension chain does not involve magnetic steel (such as permanent magnet) in related technologies. Positioning and matching surfaces of each component in this dimension chain can be machined to ensure their shape and position accuracy, so that the positioning of the radial iron core 201 is more accurate, thereby effectively avoiding a problem of large positioning accuracy error of the radial iron core 201 due to the positioning of the radial iron core 201 in the related technologies being related to the magnetic steel.

In some embodiments, an end opening of a central through hole of the magnetic conductive ring 103 includes a limiting ring boss extending radially inward, and the limiting ring boss is capable of limiting an axial direction of the radial iron core 201. In this way, a radial direction of the radial iron core 201 is positioned by the central through hole of the magnetic conductive ring 103, and the axial direction of the radial iron core 201 is positioned by the central through hole of the magnetic conductive ring 103. It can be understood that relative positions of the magnetic conductive ring 103 and the radial iron core 201 can be finally locked by interference fit, bonding, etc. A positioning connection between the magnetic conductive ring 103 and the axial positioning surface and radial positioning surface of the annular positioning boss 102 can further be reliably formed by interference fit or bonding.

In some embodiments, the magnetic bearing further includes a plurality of magnetic steels 301 (specifically, for example, permanent magnets). An annular clearance is formed between an outer circumferential wall of the magnetic conductive ring 103 and a wall of the first accommodating space. The plurality of the magnetic steels 301 is arranged in the annular clearance at intervals along a circumference of the annular clearance. A fitting clearance is formed between the magnetic steels 301 and the annular clearance. The magnetic steels 301 are arranged in the annular clearance to make a structure of the magnetic bearing more compact. At the same time, a fitting clearance between the magnetic steels 301 and the annular clearance facilitates installation of the magnetic steels 301, and can further prevent the magnetic steels 301 from exerting force on the magnetic conductive ring 103, which causes an adverse effect on a shape and position of the magnetic conductive ring 103 so as to reduce a position accuracy of the radial iron core 201. It is understandable that at this time, processing difficulty of the magnetic steels 301 will be reduced because excessively high dimensional accuracy of the magnetic steels 301 is no need to be considered. In some embodiments, the magnet steel 301 can be a square-cylindrical magnet steel. In this case, a corresponding outer circumferential wall of the magnetic conductive ring 103 and an inner wall of the first accommodating space are corresponding polygons to form a plane with a mating surface between square-cylindrical magnetic steels. In this way, a structure of polygon can be used to position the magnetic steels circumferentially without the need of separately setting up a corresponding fixing frame of the magnet steels, thereby further simplifying the structure of the magnetic bearing.

In some embodiments, the magnetic bearing further includes two axial winding assemblies. The two axial winding assemblies are respectively connected to two axial end surfaces of the radial iron core 201 in a one-to-one correspondence. Compared with a technical solution of that the axial winding assemblies are connected to the two axial end surfaces of the magnetic conductive ring in the related art, the axial winding assemblies are connected to the radial iron core 201 in the present disclosure, so that they are closer to a radial control winding 202 of the radial iron core 201, and lead wires of the axial winding assemblies and the radial control winding can be gathered in one place and then led out to outside of the magnetic bearing. For example, a cable through hole 1011 is arranged on the first axial iron core 101, and lead wires of two axial control windings 402 and the radial control winding 202 are led out from the first accommodating space to outside of the first accommodating space via the cable through hole 1011, so that the structure of the magnetic bearing is further simplified.

In some embodiments, each axial winding assembly includes a winding skeleton 401 and an axial control winding 402. The axial control winding is wound in an annular groove of the winding skeleton 401. A side of the winding skeleton 401 facing the radial iron core 201 includes a plug-in structure, and winding skeletons 401 respectively connected to the two axial end surfaces of the radial iron core 201 are connected as a whole through the plug-in structure. The plug-in structure includes a male base 4011 and a female base 4012, and the male base 4011 and the female base 4012 are both arranged on a same winding skeleton 401. In this case, the male base 4011 of one of the two axial winding assemblies opposite to each other can be reliably connected (for example, be fixedly connected by gluing, interference fit, etc.) to the female base 4012 of the other of the two axial winding assemblies. It can be understood that the radial iron core 201 is further provided with a through hole for the plug-in structure to pass through.

The magnetic bearing further includes a second axial iron core 104, which is detachably connected to the first axial iron core 101 so as to be able to close the first accommodating space, i.e., the first axial iron core 101 and the second axial iron core 104 objectively form an outer shell of the magnetic bearing. It should be particularly emphasized that in the present disclosure, the axial winding assemblies, radial iron core 201, radial control winding 202, magnetic conductive ring 103, annular positioning boss 102 and first axial iron core 101 in the magnetic bearing are assembled as a whole to constitute a first part of the magnetic bearing, the second axial iron core 104 constitutes a second part of the magnetic bearing, and the rotating shaft assembly serves as a third part, so that integration and compactness of the magnetic bearing disclosed are improved, which greatly facilitates an assembly and disassembly process of the magnetic bearing.

In some embodiments, the annular positioning boss 102 is a non-magnetic positioning ring which is detachably connected to the first accommodating space. It can be understood that the material of the first axial iron core 101 is a magnetic material. Specifically, the annular positioning boss 102 can be connected to the first accommodating space by an interference fit, i.e., an interference fit is adopted between the annular positioning boss 102 and the first axial iron core 101.

In some embodiments, the magnetic bearing further includes a rotating shaft assembly, which includes a thrust plate 600. The first axial iron core 101 and/or the second axial iron core 104 includes a thrust plate through-hole embedded with a protective bearing 601, and the protective bearing 601 is sleeved with a clearance on an outer circumferential side of the thrust plate 600. Specifically referring to FIG. 3, there are a radial air gap g1 between the radial iron core 201 and a rotor core 502, an axial air gap g2 between the second axial iron core 104 and the core shaft end baffle 503 adjacent to the second axial iron core 104, an axial air gap g3 (not illustrated in the figure) between the first axial iron core 101 and the core shaft end baffle 503 adjacent to the first axial iron core 101, an axial air gap g4 between the protective bearing 601 on a left side of the rotating shaft and a left end of the thrust plate 600, and an axial air gap g5 (not illustrated in the figure) between the protective bearing 601 on a right side of the rotating shaft and a right end of the thrust plate. It should be ensured that g2>g4 and g3>g5 so that the protective bearing 601 has a protective effect, an air gap g6 is between the protective bearing 601 and a radial direction of the thrust plate 600, and the axial air gaps follow g1>g6.

Control logic of the magnetic bearing includes axial bearing control logic and radial control logic. The two control logics are substantially the same. Take the axial bearing control logic as an example, when a sensor detects that axial air gaps follow g2>g3, a controller controls a direction of current in the bearing so that an electromagnetic magnetic circuit in the second axial iron core 104 is superimposed with a permanent magnetic circuit, a bearing force Ff on the front side of the bearing (front bearing output) is larger than a bearing force Fr on the rear side of the bearing (rear bearing output), i.e., Ff>Fr (referring a left side as the front and a right side as the rear in an orientation shown in FIG. 3), and the rotating shaft assembly moves to the left. Similarly, when the sensor detects that the axial air gaps follow g2<g3, the controller controls the current in the bearing to change the direction of the current, so that the rotating shaft assembly moves right.

Figure 7:
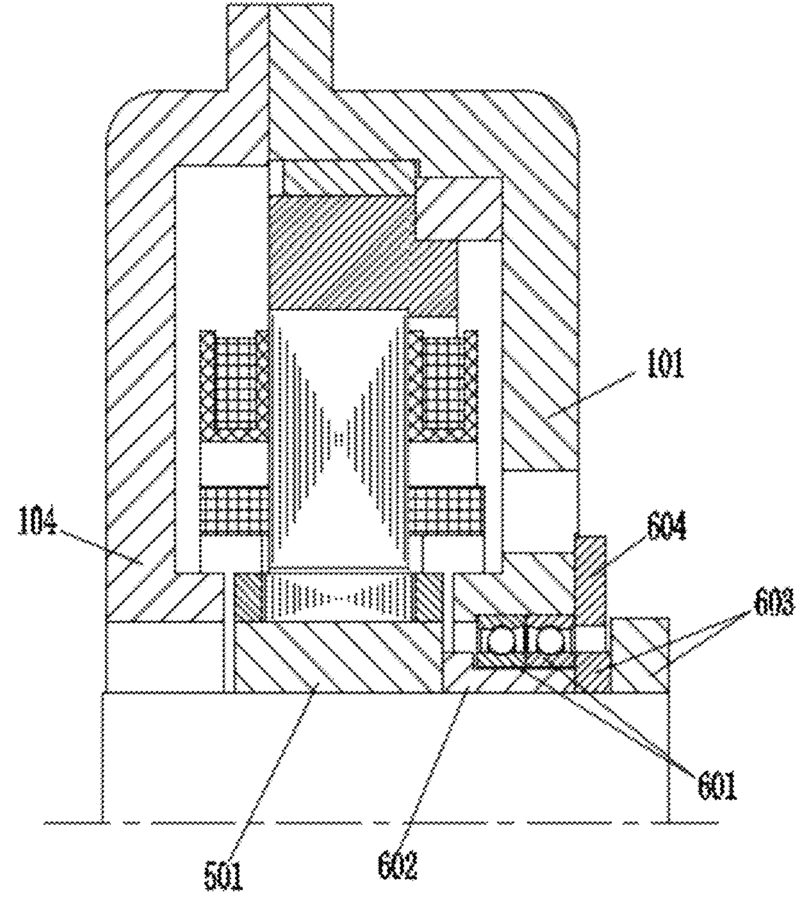
FIG. 7 is a schematic diagram (partial cross-sectional view) illustrating an internal structure of a magnetic bearing in another embodiment of the present disclosure, and arrows in the FIG. 7 illustrate an axial control magnetic circuit.
Figure 8:
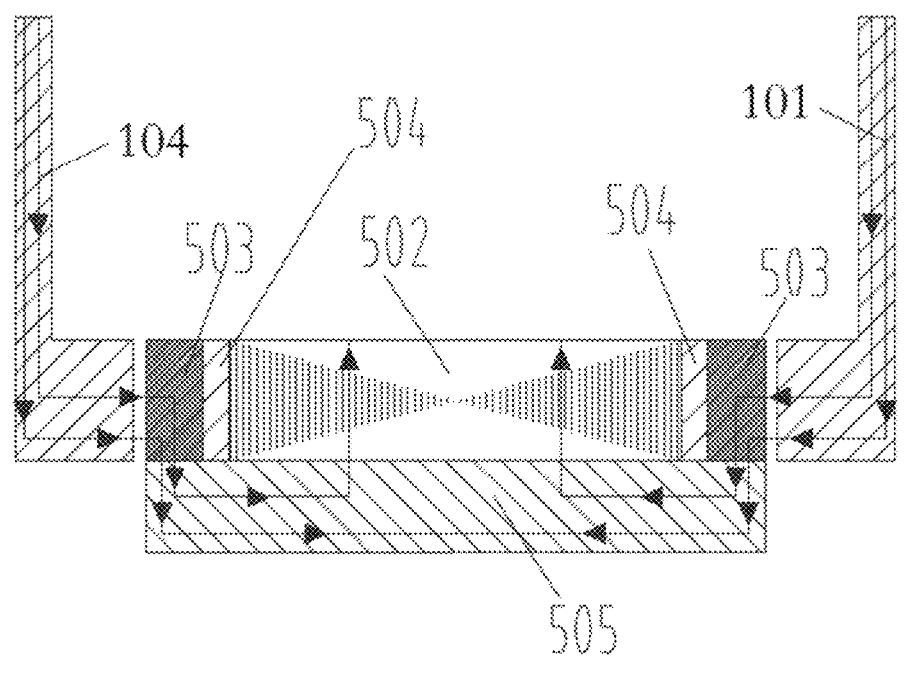
FIG. 8 to FIG. 14 are schematic diagrams illustrating structures of rotor assemblies in magnetic bearings in different embodiments (including a structure of an axial iron core).
Figure 9:
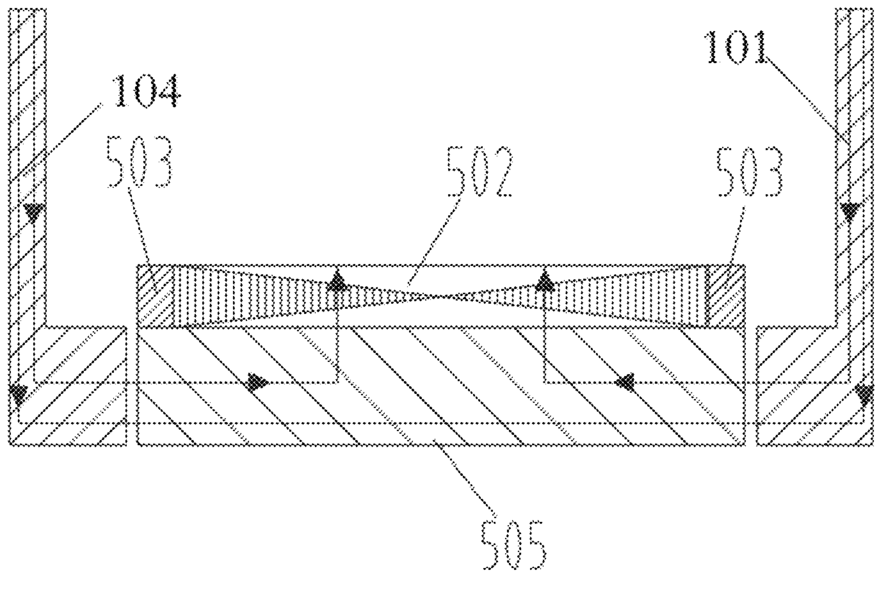
Figures 10, 11:
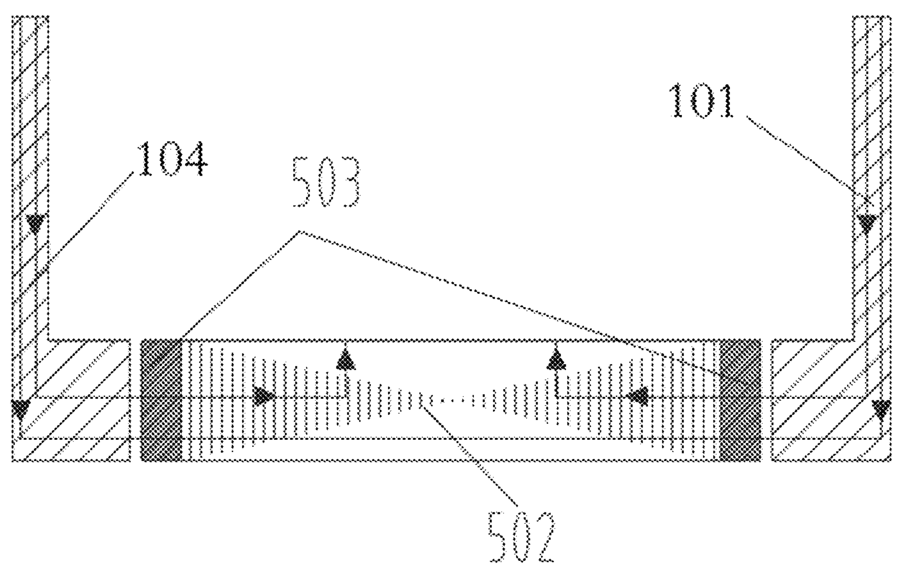
Figure 12:
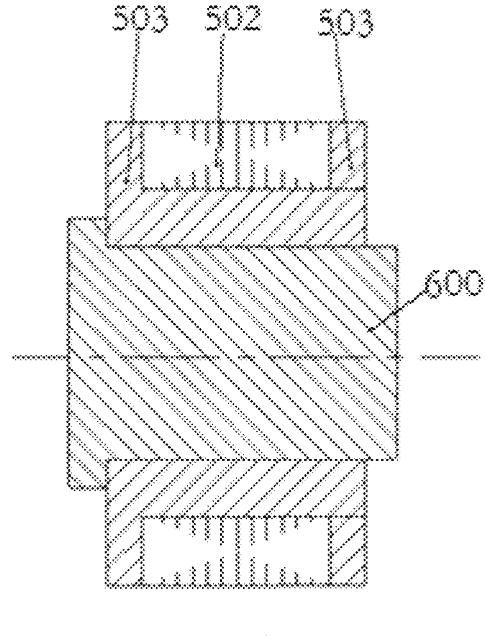
Figure 13:
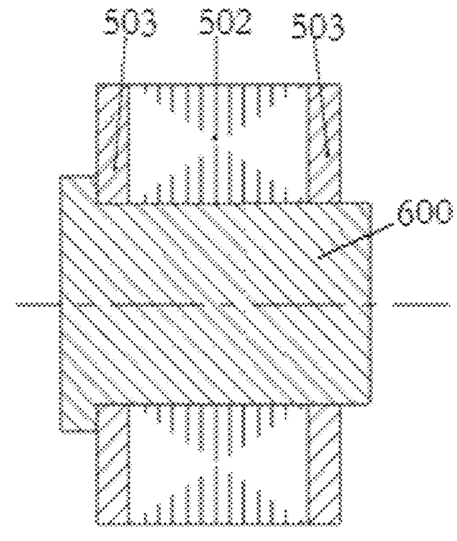
Figure 14:
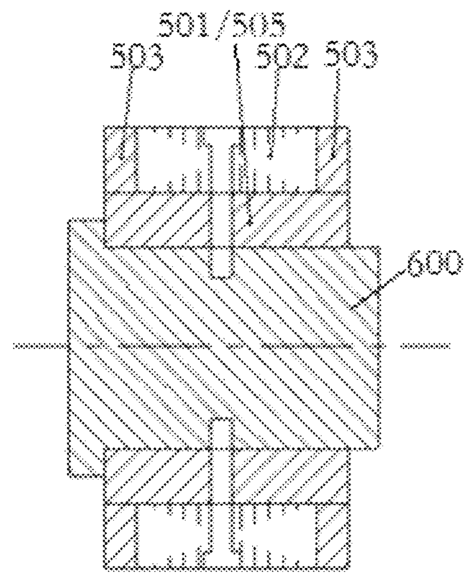

In other embodiments, as shown in FIG. 7, an axial clearance adjustment ring 602 is sleeved on an outer circumferential side of the thrust plate 600. The protective bearing 601 is sleeved with a clearance on an outer circumference of the axial clearance adjustment ring 602. The rotor core assembly and a locking member 603 spaced therefrom are further sleeved on the outer circumference of the thrust plate 600. The axial clearance adjustment ring 602 is clamped by the locking member 603 and the rotor core assembly. An axial limiting clearance groove is formed on an outer circumferential wall of the axial clearance adjustment ring 602. An inner ring of the protective bearing 601 is sleeved in the axial limiting clearance groove. An axial length of the protective bearing 601 is less than an axial length of the axial limiting clearance groove to form an axial protection clearance therebetween. The axial protection clearance of the protective bearing is adjusted by replacing the axial clearance adjustment rings 602 with an axial limiting clearance groove having different groove widths (i.e., axial lengths). For example, the locking member 603 can be a locking nut and a gasket between the locking nut and the inner ring of the protective bearing 601. It can be understood that the axial direction of the protective bearing 601 should also be limited. For example, when the protective bearing 601 is assembled on the first axial iron core 101, the first axial iron core 101 further includes a bearing cover 604, which is detachably connected to an outer side of the first axial iron core 101.

In some embodiments, the magnetic bearing further includes a rotating shaft assembly. The rotating shaft assembly includes a non-magnetic conductive collar 501 and a rotor core 502 sleeved on an outer circumferential side of the non-magnetic conductive collar 501. Both axial ends of the rotor core 502 are provided with a core shaft end baffle 503 to axially position the rotor core 502. The core shaft end baffle 503 is magnetically conductive, and an axial adjustment clearance is formed between the core shaft end baffle 503 and the first axial iron core 101 or the second axial iron core 102 adjacent thereto. Alternatively, the rotating shaft assembly includes a magnetic conductive collar 505 and a rotor core 502 sleeved on its outer circumference side. Both axial ends of the rotor core 502 are provided with a core shaft end baffle 503 to axially position the rotor core $02. The core shaft end baffle 503 is magnetic conductive, and an axial adjustment clearance is formed between the core shaft end baffle 503 and the first axial iron core 101 or the second axial iron core 102 adjacent thereto. This arrangement has low magnetic resistance and higher magnetic flux utilization. When the rotating shaft assembly includes a magnetic conductive collar 505, a magnetic isolation plate 504 is further arranged between the core shaft end baffle 503 and a corresponding end of the rotor core 502 to ensure that the magnetic flux can pass through the magnetic conductive collar 505.

In another embodiment, the rotating shaft assembly includes a rotor core 502, the rotor core 502 is sleeved on an outer circumferential side of the thrust plate 600, both axial ends of the rotor core 502 are provided with a core shaft end baffle 503 to axially position the rotor core 502, and the core shaft end baffle 503 is magnetically conductive. In some embodiments, at least one of the two core shaft end baffles 503 includes an extension collar extending axially toward a side of the rotor core 502, and the extension collar is sleeved between a central through hole of the rotor core 502 and an outer circumferential wall of the thrust plate 600. In this technical solution, only the core shaft end baffle 503 is provided without the need to provide aforementioned non-magnetic conductive collar 501 or magnetic conductive collar 505, so that a structure of the rotating shaft assembly is simplified.

In some embodiments, the rotating shaft assembly further includes a non-magnetic conductive collar 501 or a magnetic conductive collar 505, and positioning between the rotor core 502 and the non-magnetic conductive collar 501 or the magnetic conductive collar 505 and the thrust plate 600 is achieved by positioning screws. Thus, the interference fit between assembled components is not required, thereby improving assembly efficiency and facilitating replacement.

The protective bearing 601 is a deep groove ball bearing or an angular contact ball bearing (used in pairs), which provides radial protection and axial protection. Angular contact bearings are generally used in pairs, and generally adopt steel bearings, ceramic ball bearings, or hybrid ceramic ball bearings. An outer ring of the protective bearing 601 is fitted by interference with the first axial iron core 101 and the second axial iron core 104 in the radial direction, to limit the outer ring of the protective bearing from moving in the axial direction. Alternatively, other limiting ways can be adopted, such as gluing or bearing clamps.

According to an embodiment of the present disclosure, a compressor is further provided, including the above-mentioned magnetic bearing.

It is easy for those skilled in the art to understand that, under the premise of no conflict, the above-mentioned advantageous ways can be freely combined and superimposed.

The above specific embodiments are only preferred embodiments of the present disclosure and are not intended to limit the present disclosure. Any modifications, equivalent replacements and improvements made without departing from the connotation of the present disclosure should be included in the scope of the present disclosure. The above are only preferred implementations of the present disclosure. It should be pointed out that for ordinary technicians in this technical field, several improvements and variations can be made without departing from the technical connotation of the present disclosure, and these improvements and variations should also be regarded as the scope of the present disclosure.

The invention claimed is:

1. A magnetic bearing, comprising a first axial iron core and a radial iron core, wherein the first axial iron core comprises a first accommodating space in which an annular positioning boss is arranged, the annular positioning boss comprises an axial positioning surface and a radial positioning surface, a magnetic conductive ring is arranged in the first accommodating space, the magnetic conductive ring is capable of being cooperatively connected to both the axial positioning surface and the radial positioning surface to position the magnetic conductive ring in both an axial direction and a radial direction of the first axial iron core, and the magnetic conductive ring is sleeved on an outer circumferential wall of the radial iron core.

2. The magnetic bearing of claim 1, wherein an end opening of a central through hole of the magnetic conductive ring comprises a limiting ring boss extending radially inward, and the limiting ring boss is capable of limiting an axial direction of the radial iron core.

3. The magnetic bearing of claim 1, further comprising a plurality of magnetic steels, an annular clearance being formed between an outer circumferential wall of the magnetic conductive ring and a wall of the first accommodating space, the plurality of the magnetic steels being arranged in the annular clearance at intervals along a circumference of the annular clearance, and a fitting clearance being formed between the magnetic steels and the annular clearance.

4. The magnetic bearing of claim 1, further comprising two axial winding assemblies, wherein the two axial winding assemblies are respectively connected to two axial end surfaces of the radial iron core in a one-to-one correspondence.

5. The magnetic bearing of claim 4, wherein each axial winding assembly comprises a winding skeleton and an axial control winding, the axial control winding is wound in an annular groove of the winding skeleton, a side of the winding skeleton facing the radial iron core comprises a plug-in structure, and winding skeletons respectively connected to the two axial end surfaces of the radial iron core are connected as a whole through the plug-in structure.

6. The magnetic bearing of claim 5, wherein the plug-in structure comprises a male base and a female base, and the male base and the female base are both arranged on a same winding skeleton.

7. The magnetic bearing of claim 5, wherein a radial control winding is wound on the radial iron core, a cable through hole is arranged on the first axial iron core, and lead wires of two axial control windings and the radial control winding are led out from the first accommodating space to outside of the first accommodating space via the cable through hole.

8. The magnetic bearing of claim 1, further comprising a second axial iron core, wherein the second axial iron core is detachably connected to the first axial iron core so as to be able to close the first accommodating space.

9. The magnetic bearing of claim 8, further comprising a rotating shaft assembly, wherein the rotating shaft assembly comprises a thrust plate, at least one of the first axial iron core and the second axial iron core comprises a thrust plate through-hole embedded with a protective bearing, and the protective bearing is sleeved with a clearance on an outer circumferential side of the thrust plate.

10. The magnetic bearing of claim 9, wherein an axial clearance adjustment ring is sleeved on the outer circumferential side of the thrust plate, the protective bearing is sleeved with a clearance on an outer circumferential side of the axial clearance adjustment ring, the outer circumferential side of the thrust plate is further sleeved with a rotor core assembly and a locking member spaced therefrom, the axial clearance adjustment ring is clamped by the locking member and the rotor core assembly, an axial limiting clearance groove is formed on an outer circumferential wall of the axial clearance adjustment ring, an inner ring of the protective bearing is sleeved in the axial limiting clearance groove, and an axial length of the protective bearing is less than an axial length of the axial limiting clearance groove to form an axial protection clearance therebetween.

11. The magnetic bearing of claim 9, wherein the protective bearing comprises a deep groove ball bearing or an angular contact ball bearing.

12. The magnetic bearing of claim 1, further comprising a rotating shaft assembly, wherein the rotating shaft assembly comprises a magnetic conductive collar and a rotor core sleeved on an outer circumferential side of the magnetic conductive collar, both axial ends of the rotor core are provided with a core shaft end baffle to axially position the rotor core, the core shaft end baffles are magnetically conductive, and an axial adjustment clearance is formed between the core shaft end baffles and the first axial iron core or the second axial iron core adjacent thereto.

13. The magnetic bearing of claim 12, wherein a magnetic isolation plate is further arranged between the core shaft end baffles and a corresponding end of the rotor core.

14. The magnetic bearing of claim 1, further comprising a rotating shaft assembly, wherein the rotating shaft assembly comprises a rotor core, the rotor core is sleeved on an outer circumferential side of a thrust plate, both axial ends of the rotor core are provided with a core shaft end baffle to axially position the rotor core, and the core shaft end baffles are magnetically conductive.

15. The magnetic bearing of claim 14, wherein at least one of two core shaft end baffles comprises an extension collar extending axially toward a side of the rotor core, and the extension collar is sleeved between a central through hole of the rotor core and an outer circumferential wall of the thrust plate.

16. The magnetic bearing of claim 14, wherein the rotating shaft assembly further comprises a non-magnetic conductive collar or a magnetic conductive collar, and positioning between the rotor core and the non-magnetic conductive collar, or between the magnetic conductive collar and the thrust plate, is achieved by positioning screws.

17. A compressor, comprising the magnetic bearing of claim 1.

18. The magnetic bearing of claim 1, wherein the annular positioning boss is a non-magnetic positioning ring detachably connected to the first accommodating space.

19. The magnetic bearing of claim 18, wherein the annular positioning boss is connected to the first accommodating space by an interference fit.

20. The magnetic bearing of claim 1, further comprising a rotating shaft assembly, wherein the rotating shaft assembly comprises a non-magnetic conductive collar and a rotor core sleeved on an outer circumferential side of the non-magnetic conductive collar, both axial ends of the rotor core are provided with a core shaft end baffle to axially position the rotor core, the core shaft end baffles are magnetically conductive, and an axial adjustment clearance is formed between the core shaft end baffles and the first axial iron core or a second axial iron core adjacent thereto.

* * * * *